United States Patent [19]
Sander et al.

[11] 4,099,209
[45] Jul. 4, 1978

[54] ELECTRONIC CONTROL SYSTEM FOR MULTIPLE CASSETTE RECORD AND/OR PLAYBACK APPARATUS

[75] Inventors: Willy M. Sander, Stamford; James C. Whitney, Weston, both of Conn.

[73] Assignee: Dictaphone Corporation, Rye, N.Y.

[21] Appl. No.: 722,162

[22] Filed: Sep. 10, 1976

[51] Int. Cl.² .................... G11B 15/68; G11B 23/04
[52] U.S. Cl. ............................. 360/92; 360/71; 360/96
[58] Field of Search ............... 360/92, 91, 96, 132, 360/134, 69, 71–74, 105–106; 242/197–200, 180–181; 352/6–8; 214/16.4

[56] References Cited
U.S. PATENT DOCUMENTS

| 3,431,367 | 3/1969 | Nickl | 360/92 |
| 3,658,193 | 4/1972 | Gross | 360/96 |
| 3,671,682 | 6/1972 | Suzuki | 360/92 |
| 3,825,949 | 7/1974 | Pyles | 360/92 |
| 3,848,264 | 11/1974 | Wilson | 360/92 |
| 3,886,591 | 5/1975 | Bettini | 360/92 |
| 3,996,616 | 12/1976 | Sturrock | 360/71 |
| 3,996,617 | 12/1976 | Cousino | 360/92 |
| 4,021,855 | 5/1977 | Czonka et al. | 360/69 |
| 4,024,354 | 5/1977 | Bolick, Jr. et al. | 360/69 |

FOREIGN PATENT DOCUMENTS 949,193  6/1974  Canada .................................. 360/92

Primary Examiner—Alfred H. Eddleman
Attorney, Agent, or Firm—Arthur V. Smith

[57] ABSTRACT

An electronic control system for controlling the sequential operations in a multiple cassette record and/or playback apparatus of the type having a supply of tape cassettes, a motor-driven conveyor for conveying individual cassettes from the supply to a record/playback station and thence to an output store, the record/playback station having a motor-driven deck for loading and unloading a cassette, and the output store having a motor-driven elevator for loading a recorded cassette into the output store. Monitors are provided for monitoring the operation of each of the motor-driven conveyor, deck and elevator to sense when a cassette has been conveyed to the record/playback station, when a cassette has been loaded onto the deck and when a cassette has been loaded into the output store. Logic circuitry is responsive to the monitors for energizing motor-drive circuitry in accordance with a predetermined sequential cycle of operation.

Malfunction detection apparatus is provided to detect if a sequential cycle is not completed within a predetermined time and to prevent the initiation of a subsequent sequential cycle in the event of a malfunction.

25 Claims, 5 Drawing Figures

ELECTRONIC CONTROL SYSTEM FOR MULTIPLE CASSETTE RECORD AND/OR PLAYBACK APPARATUS

BACKGROUND OF THE INVENTION

This invention relates to a multiple cassette record and/or playback apparatus and, more particularly, to an electronic control system for controlling the sequential operation of the various interdependent elements of that apparatus.

Magnetic tape cassettes wherein a magnetic tape is stored in a self-contained cartridge are widely used in various record and/or playback devices, such an in home entertainment systems, data logging systems, dictation systems and the like. Such tape cassettes offer the advantages of greatly simplifying the loading and unloading of tape by an operator, of protecting the tape during recording and playback operations and during handling of the tape, and of minimizing the bulk of the recording and playback devices used therewith. However, since the amount of tape that can be stored easily in a typical cartridge is rather limited, there are finite limits as to the amount of information that can be recorded thereon. In an attempt to increase such limitations of recorded information, some cassette manufacturers have attempted to increase the length of tape stored in a cassette. Nevertheless, in many applications, it is desirable to record and/or play back information substantially continuously for a length of time that exceeds the capacity of a given cassette.

Accordingly, there have been proposals for automatic cassette-changing devices whereby a multiple of tape cassettes can be automatically loaded individually and successively onto a record/playback deck to permit an operator to record or reproduce substantial lengths of information. In one proposed automatic cassette changing device, described in U.S. Pat. No. 3,821,806, a plurality of cassettes are stored in drum-like configuration and are retrieved individually to be loaded onto a record/playback deck and then returned to the storage drum. This proposed device requires a relatively complex mechanical structure for the retrieval, loading, unloading and return of cassettes.

In another proposed automatic cassette changer, such as described in U.S. Pat. No. 3,752,485, a plurality of cassettes are stored in a magazine of a type that is commonly found in photographic slide projector apparatus. As the magazine is indexed, individual cassettes are sequentially "pushed" from their storage compartments by a pushing arm and loading onto a record/playback deck. After information is recorded on or reproduced from the loaded cassette, it is returned to its storage compartment by the pushing arm and the magazine then is indexed to enable the next cassette to be retrieved. A similar magazine-type cassette-changer is described in U.S. Pat. No. 3,860,964. These types of cassette-changing devices require a relatively complex mechanical construction and, moreover, are subject to various malfunctions, such as cassette jams, during loading and unloading operations. Moreover, if used to record information thereon, it may be difficult to withdraw recorded cassettes from the magazine until the full complement of cassettes have been used.

In a further proposed automatic cassette-changer, such as described in U.S. Pat. No. 3,756,608 or in U.S. Pat. No. 3,758,122, a plurality of cassettes are stored in a magazine in stacked configuration, and individual cassettes are loaded onto a record/playback deck and thence into an output magazine, also in stacked configuration. As described in U.S. Pat. No. 3,756,608, the record/playback deck is disposed beneath the input stack and a movable platform lowers the cassettes from the input stack onto the deck. After a recording or playback operation, the platform is raised and a "pusher" pushes the cassette from the platform into the output magazine. In U.S. Pat. No. 3,758,122, the deck is positioned intermediate the input and output magazines and a feed plate pushes the lowermost cassette from the input magazine onto the deck and thence into the output magazine. The use of mechanical "pushers" or feed plates is undesirable because of a susceptibility to jam the cassettes during a loading and/or unloading operation. Furthermore, since the next succeeding cassette cannot be loaded onto the deck until the immediately preceding cassette is fully unloaded by the mechanical "pusher" or feed plate, these automatic cassette-changers are relatively inefficient. That is, since these changers are not capable of loading a cassette simultaneously with unloading a cassette, a significant amount of time is required for a complete unloading/loading cycle.

Another disadvantage of automatic cassette-changer devices of the type described above is that the progress of the various interdependent operations, such as cassette-loading, recording or playback and cassette-unloading, is not monitored. Furthermore, most of these devices do not adequately control or synchronize successive operations. For example, some of these prior art automatic cassette-changers rely upon mechanical elements, such as timing cams, or the like, to initiate and drive the various changer elements. Accordingly, there is the strong possibility that, in the event of a minor malfunction in one portion of the apparatus or the event that a particular operation is delayed slightly or instituted prematurely, a serious jam or other malfunction can occur resulting in substantial damage to the cassette-changer.

OBJECTS OF THE INVENTION

Therefore, it is an object of the present invention to provide improved cassette-changing apparatus.

Another object of this invention is to provide an electronic control system for a multiple cassette record and/or playback apparatus whereby the aforenoted problems attending prior art devices are avoided.

A still further object of this invention is to provide control logic for controlling successive and interdependent operations performed in a multiple cassette-changer device.

An additional object of this invention is to provide electronic control apparatus for a cassette-changer wherein the progress of various operations performed by the cassette-changer elements is monitored and used to detect a possible malfunction.

Yet another object of this invention is to provide improved electronic control apparatus for a multiple cassette record and/or playback apparatus of the type having a supply of tape cassettes arranged in stacked configuration, a motor driven conveyor belt for conveying individual cassettes from the supply to a record/playback deck and thence to an output store whereat cassettes are stored in stacked configuration, the record/playback deck being pivoted between unloaded and operating positions, and the output store having a motor driven elevator for loading each cassette conveyed thereto into an output stack.

Various other objects, advantages and features of the present invention will become readily apparent from the ensuing detailed description, and the novel features will be particularly pointed out in the appended claims.

SUMMARY OF THE INVENTION

In accordance with the present invention, an electronic control system is provided for controlling the operation of multiple cassette record and/or playback apparatus, such apparatus being of the type having a supply of tape cassettes, a motor-driven conveyor belt for conveying individual cassettes from the supply to a record/playback deck and thence to an output store, the record/playback deck being driven between an unloaded position to receive a cassette and an operative position for a record and/or playback operation and the output store having a motor-driven elevator for loading a conveyed cassette into the output store, the electronic control system comprising monitor devices for monitoring the operation of the conveyor belt, the deck and the elevator to sense when a cassette has been conveyed to the deck, when a cassette has been loaded for a record and/or playback operation and when a cassette has been loaded into the output store; and sequence control logic responsive to the monitor devices for energizing the conveyor belt, the deck and the elevator in accordance with a predetermined sequential cycle. In a preferred embodiment, a timing device is provided for detecting whether the sequential cycle has been completed within a predetermined time and, in the event that such cycle has not been so completed, to prevent the initiation of a subsequent cycle.

BRIEF DESCRIPTION OF THE DRAWINGS

The following detailed description, given by way of example, will best be understood in conjunction with the accompanying drawings in which.

DETAILED DESCRIPTION OF A PREFERRED EMBODIMENT

The electronic control system described below is adapted to control the sequential operation of the automatic cassette-changer apparatus that can be used in, for example, a central dictation system using magnetic cassettes as the recording medium, a home entertainment system wherein prerecorded magnetic tape cassettes are played back in sequence, in a data logging system wherein data is recorded on individual magnetic tape cassettes, and the like. For the purpose of explaining the present invention, it will be assumed that the automatic cassette changer is used in the environment of a central dictation system. However, it should be clearly understood that this environment merely is illustrative and is not intended to limit the scope or use of the electronic control system.

Overall Mechanical Arrangement of the Automatic Cassette-Changer

Figure 1:
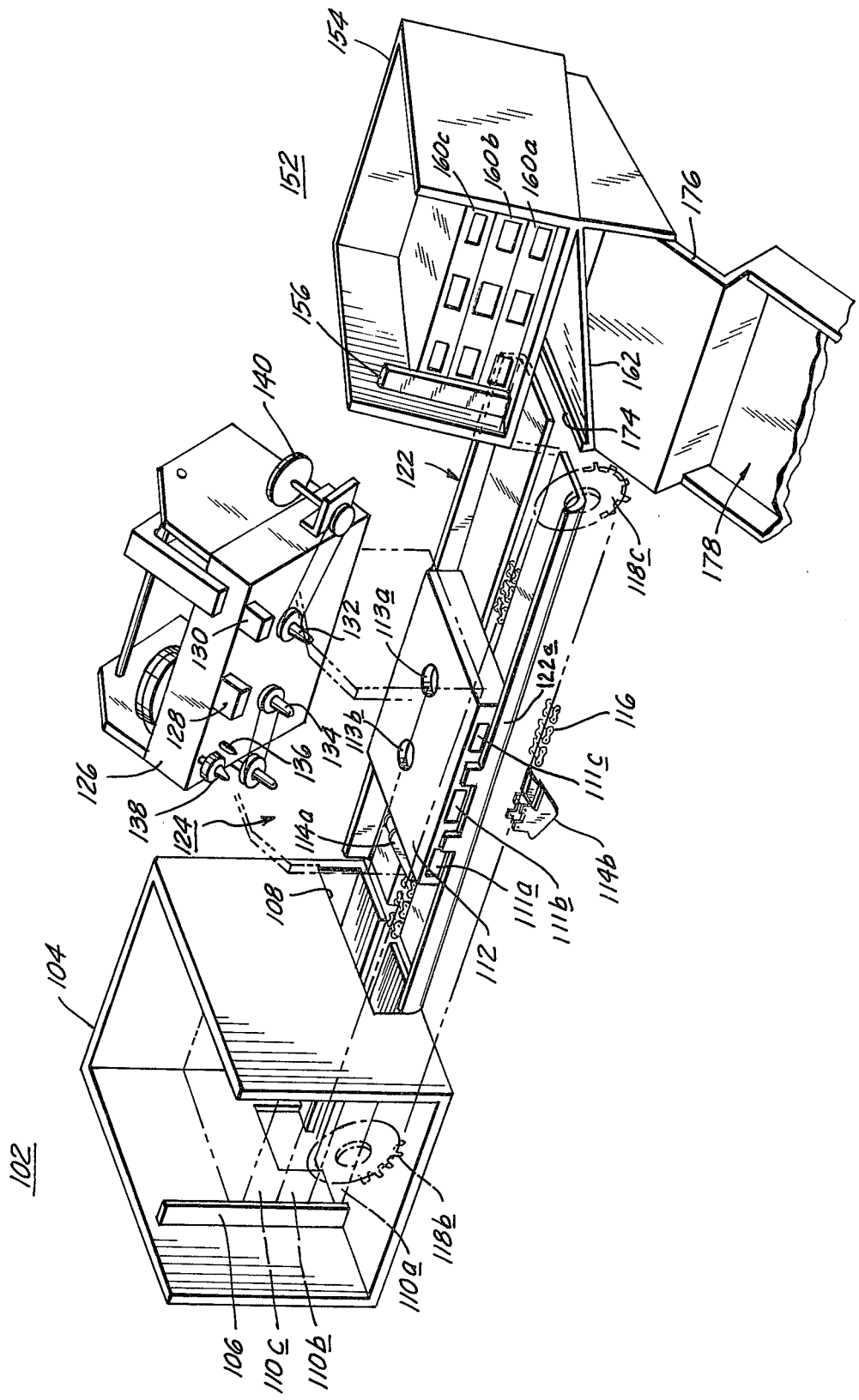
FIG. 1 is a perspective view of a preferred embodiment multiple cassette record and/or playback apparatus.
Figure 2:
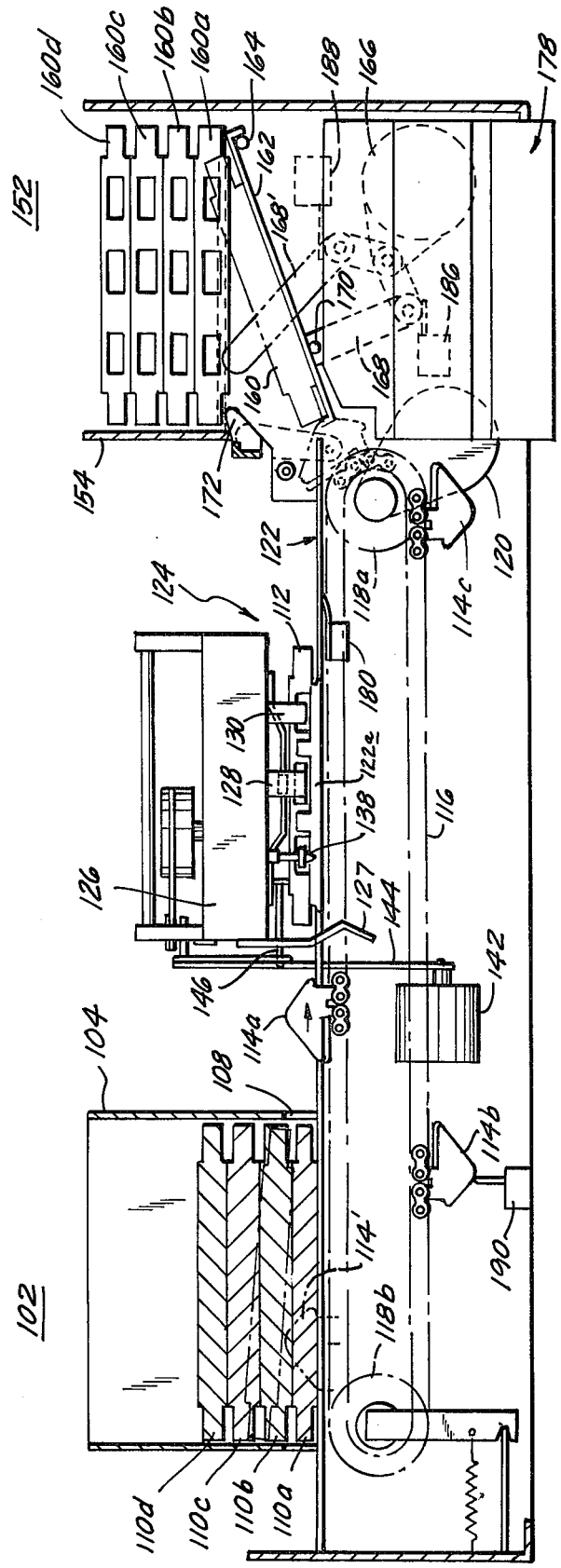
FIG. 2 is a front plan view of the apparatus shown in FIG. 1.
Figure 3:
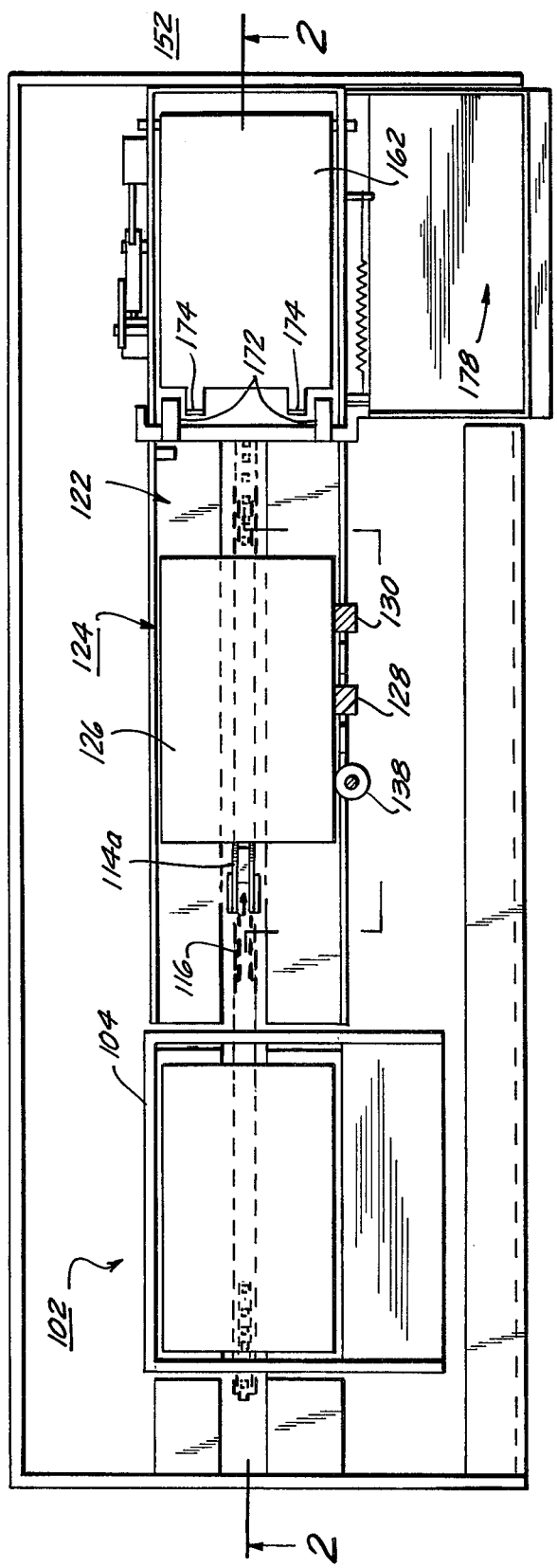
FIG. 3 is a schematic representation showing the operation of a portion of the record and/or playback apparatus.

A preferred embodiment of the mechanical components comprising the automatic cassette-changer which, as aforesaid, may be used in a central dictation system, is shown in FIGS. 1-3. The central dictation system may be of the type having electrical connections (not shown) to individual ones of a multiple of remote dictate stations, each such remote station having suitable controls to enable an operator to initiate a dictate operation and to review his previously dictated information, or messages. The system is comprised of an input stack 102 adapted to store, in stacked configuration, a multiple of magnetic tape cassettes, such as cassettes 110a, 110b..., a record/playback station 124 having a record and/or playback deck 126 adapted to record information on and play back information from a magnetic tape cassette, and an output store 152 to which processed cassettes, i.e., cassettes which have had information recorded on or pre-recorded information played back from the tape stored therein, are conveyed.

Input stack 102 may comprise a magazine 104 to support the stack of cassettes 110a, 110b... therein, the input stack also being provided with a guide rail 106 for the proper positioning and alignment of the stacked cassettes. An exit 108 is formed in one of the walls of magazine 104 to permit the lowermost cassette 110a to be conveyed from stack 102 toward record/playback station 124 by suitable conveying devices 114 secured to a conveyor belt 116.

Conveyor belt 116 preferably is a chain deployed about sprockets 118a, 118b and is driven by a belt motor 120 (FIG. 2). Plural wedge-shaped flights 114a, 114b..., are mechanically secured to belt 116 and are spaced along the length of the belt. Each flight 114 is adapted to contact the bottom-most cassette 110a in input stack 102, to remove that cassette from the stack (as shown in FIG. 2) and to push that cassette to record/playback station 124. The wedge-shape of the flights is preferred so that when a flight, such as flight 114' shown in broken lines in FIG. 2, pushes the bottom-most cassette 110a through exit 108, the remaining cassettes 110b, 110c... in input stack 102 are raised gently over the wedge-shaped flight without impeding the removal of cassette 110a and, furthermore, without jostling the remaining cassettes.

A guide platform 122 extends substantially between input stack 102 and output store 152 for the purpose of suitably supporting and guiding a cassette, such as cassette 112, that is conveyed from input stack 102 to record/playback station 124 and then to output store 152. Record/playback deck 126 is provided at station 124 intermediate input stack 102 and output store 152, as shown. The deck includes a record/playback head 128 and an erase head 130 which are conventional in record/playback apparatus and which are adapted to be inserted through appropriate apertures in cassette 112 so as to engage the tape therein. Deck 126 also includes a supply reel drive spindle 132, a take-up reel drive spindle 134, a capstan 136 and a pinch roller 138, as is conventional. Preferably, deck 126 is of the type whose construction is disclosed in greater detail in copending Applications Ser. Nos. 678,596 and 678,704, both filed Apr. 20, 1976 and both assigned to the assignee of the present invention.

In the illustrated embodiment, deck 126 is coupled to a deck drive motor 142 (FIG. 3), preferably a unidirectional motor, by linkage 144, motor 142 being adapted to pivot the deck about a suitable pivot axis 146. Thus, depending upon whether motor 142 is energized, described in greater detail below, deck 126 is adapted to pivot between its up, or cassette unload position shown in solid lines in FIG. 1, and its down, or operative, position shown in broken lines in FIG. 1 and shown more clearly in FIG. 2. As is appreciated, when deck 126 is driven towards its down position, reel drive spindles 132 and 134 are inserted into corresponding reel drive apertures 113a and 113b in the top wall of cassette 112. Also, capstan 136 in inserted into a corresponding capstan-receiving aperture (not shown) so as to cooperate with pinch roller 138 to drive the tape housed within cassette 112. To provide a fine alignment of cassette 112, which has been conveyed to record-playback station 124, deck 126 is provided with a guide member 127 having the cammed configuration illustrated in FIG. 2 to shift cassette 112 slightly to the right so that the respective apertures in the cassette are in final alignment with drive spindles 132 and 134, and capstan 136.

Deck 126 also is provided with a chopper wheel 140 that is suitably coupled to supply reel drive spindle 132 so as to rotate when the supply reel drive spindle is driven. This chopper wheel is described in greater detail in the aforementioned copending application and cooperates with suitable photosensing devices to derive sensor pulses indicative of the movement of tape either in a record or in a playback mode. These sensor pulses may be used in the manner described in copending application Ser. No. 722,141, and also are used in a manner described in greater detail hereinbelow in respect to FIG. 4.

Output store 152 is adapted to store processed cassettes 160, 160a, 160b . . . in the so-called first-in, first-out configuration. That is, the cassette that had been used first appears on the top of output store 152, for example, cassette 160d, and the cassette that had been used last appears on the bottom of this stack, such as cassette 160a. Accordingly, an elevator assembly is adapted to receive a processed cassette, such as cassette 160, conveyed from record/playback station 124 by, for example, flight 114a. In the illustrated embodiment, the elevator assembly comprises an elevator platform 162 pivoted at 164 to magazine 154 that comprises output store 152. An elevator motor 166, preferably a unidirectional motor, is mechanically linked through linkage 168 and pin 170 to elevator platform 162, sometimes designated hereinafter merely as elevator 162, and is adapted to raise and lower the elevator so as to correspondingly add a processed cassette to the bottom of output store 152. Pivot connection 164 is disposed in a plane above the plane of guide platform 122 so that, in its cassette-receiving position, shown in FIG. 1 and in solid lines in FIG. 2, elevator 162 is angled downwardly to receive cassette 160 driven thereon by the flight as illustrated. As will be described in greater detail below, when cassette 160 is loaded onto elevator 162, elevator motor 166 is energized to pivot the elevator upwardly and thus introduce cassette 160 into output store 152.

A spring-biased bracket having projecting retaining members 172 is pivotally coupled to the chassis (not shown) of the apparatus, the retaining members extending into magazine 154 at the lower portion thereof to support the cassettes in the output store. As shown, retaining members 172 having cammed surfaces so as to permit the bracket to pivot out of interference with a cassette that is added into the output store by elevator 162.

When the illustrated apparatus is used in the environment of a central dictation system, an operator, such as a dictator at a remote dictate station, may designate the cassette upon which information is recorded as a special or "priority" cassette. Output store 152 thus is provided with a priority cassette eject feature whereby the priority cassette is discharged immediately rather than being placed as the bottom-most cassette in output store 152. Since elevator 162 is pivoted at 164 in a plane above the plane of guide platform 122, it is appreciated that if the elevator is raised, a conveyed cassette merely will pass beneath it. Accordingly, the priority cassette eject feature includes a discharge chute 176 disposed beneath elevator 162 and angled downwardly to direct a priority-ejected cassette into a storage bin 178. To this effect, when a cassette is designated as a priority cassette, elevator 162 is driven by elevator motor 166 to its raised position, as will be described in greater detail below, and then, subsequently, the priority cassette is conveyed be belt 116 towards output store 152. Since elevator 162 is not in a cassette-receiving position, the priority cassette passes beneath the raised elevator and slides down guide chute 176 into storage bin 178. Elevator 162 then may return to its normal cassette-receiving position for normal operation.

In order to monitor the progress of a change operation, and to determine when various interdependent functions should be performed in that operation, suitable limit switches are provided to sense the condition of deck 126, the condition of elevator 162, and the position of, for example, cassette 112 and flight 114b. More particularly, a limit switch 180 is disposed at record-playback station 124 and is adapted to be closed so as to produce a cassette-in-position signal when cassette 112 is conveyed by belt 116 into general alignment with deck 126 at the record/playback station. A pair of limit switches 182 and 184, shown in FIG. 3, are disposed at record/playback station 124 and cooperate with a pin, or actuator, 127 secured to deck 126. As shown, when deck 126 is pivoted to its down, or operative, position, actuator 127 closes limit switch 182 to produce a deck-down signal. Conversely, when limit switch 182 is opened, a deck-not-down signal is produced. Similarly, limit switch 184 is closed by actuator 127 to produce a deck-up signal. Hence, when this limit switch is opened, a deck-not-up signal is produced.

Limit switches 186 and 188, shown in FIG. 2, are analogous to limit switches 182 and 184, respectively, and are adapted to be closed selectively by linkage 168 depending upon the position of elevator 162. More particularly, when elevator 162 is in its down, or cassette-receiving, position, linkage 168 closes limit switch 186 to produce an elevator-down signal. Conversely, when elevator 162 is raised, such as when the linkage is in the position shown at 168', limit switch 188 is closed to produce an elevator-up signal.

Yet another limit switch 190 is provided and is adapted to be closed by a flight, such as flight 114b, that has been driven to a predetermined position with respect to input stack 102. The closing of limit switch 190 produces a belt-in-position signal, representing that a flight, such as flight 114b, is positioned to withdraw a cassette from the input stack and convey it to record/playback station 124 during a subsequent cassette-changing operation.

In operation, the initial position of belt 116 may be as illustrated by the solid lines of flights 114a, 114b . . . in FIG. 2, and it may be assumed that deck 126 is processing a cassette 112, and elevator 162 is in its cassette-receiving position for receiving cassette 112 after this cassette has been processed. As mentioned above, for the purpose of this description, the expression "processing a cassette" means recording information on a cassette, as in a central dictation system, or reproducing information from a cassette, as in a dictation system, a transcribing system or a home entertainment system. After cassette 112 has been processed, deck drive motor 142 pivots deck 126 from its own position to its up position so that cassette 112 can be conveyed to output store 152. Once deck 126 reaches its up position, belt motor 120 is energized so that flight 114a conveys cassette 112 onto elevator 162. Concurrently with this operation, flight 114b contacts the bottommost, cassette 110a in input stack 102 and conveys this cassette toward record/playback station 124. When this fresh cassette is positioned properly at record/playback station 124, deck motor 142 pivots deck 126 into operative relation with the cassette and, concurrently, elevator motor 166 pivots elevator 162 upwardly to add the last-processed cassette, such as the cassette shown at 160 in FIG. 2, into output store 152 as the bottommost cassette.

Deck 126 then may be controlled to record information on the magnetic tape housed within the cassette loaded thereon, such as the cassette designated 112, or may perform a playback operation to reproduce information that had been recorded on tape. After the record or playback operation is completed, a cassette changing cycle is initiated whereby deck motor 142 pivots deck 126 to its up position, belt motor 120 drives belt 116 to convey the processed cassette onto elevator platform 162 and to convey a fresh cassette from input stack 102 to record/playback station 124, and then elevator motor 166 drives elevator 162 to its up position while deck motor 142 now drives deck 126 to its down position. Once elevator motor 166 returns elevator 162 to its down position, the illustrated apparatus is prepared for reuse and for a subsequent cassette changing cycle.

The manner in which the respective belt, deck and elevator motors are controlled, and the manner in which the respective limit switches, 180, 182, 184, 186, 188 and 190 cooperate to monitor and control a cassette changing operation now will be described in greater detail in conjunction with the electronic control system illustrated in FIG. 4.

Electronic Control System

Figure 4A:
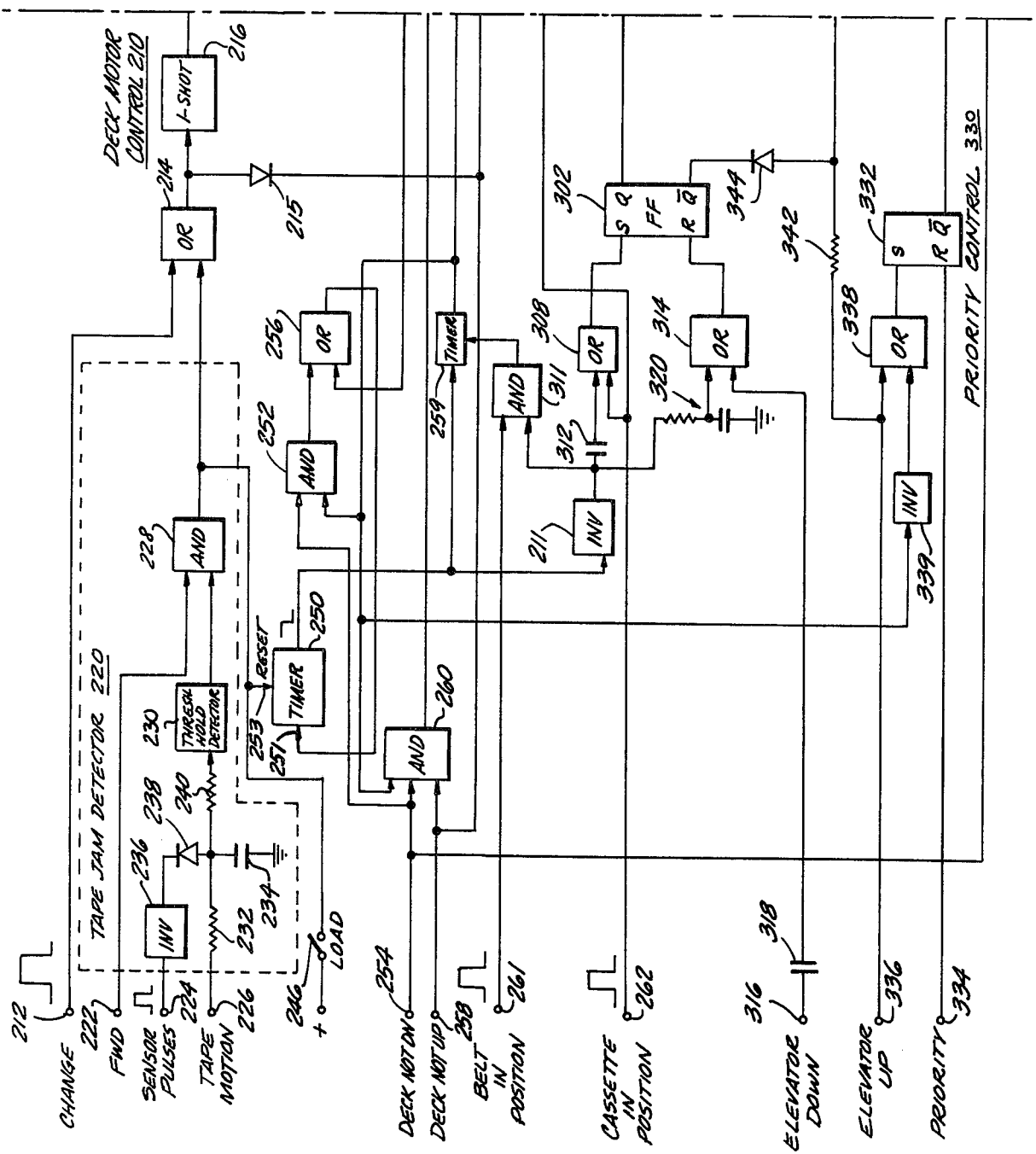
FIGS. 4A and 4B are logic diagrams of the electronic control system that is provided for controlling the operation of the apparatus shown in FIG. 1.
Figure 4B:
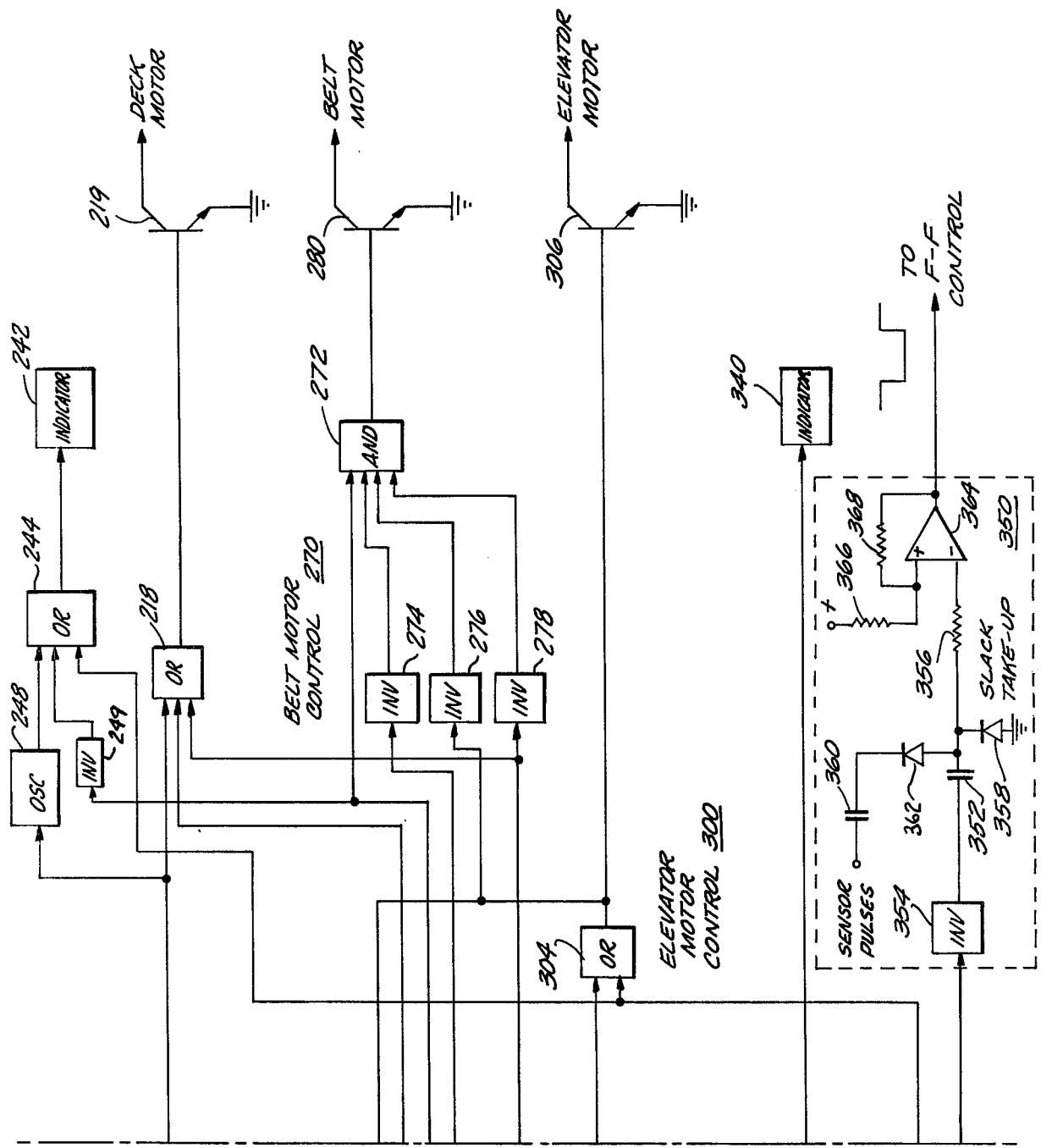

Turning now to FIG. 4, there is illustrated, in block diagram form, a logic control system for controlling the sequential cycle of operation of the aforedescribed conveyor belt, record/playback deck and elevator. In order to simplify this description, the following convention will be assumed: A logic AND gate is capable of producing a binary "1" only when a binary "1" is supplied to each input the reof. A logic OR gate is capable of producing a binary "1" when a binary "1" is supplied to at least one input thereof. A logic inverter is adapted to invert the sense of a binary signal so as to produce a binary "1" when a binary "0" is supplied thereto and, conversely, to produce a binary "0" when a binary "1" is supplied thereto. A bistable multivibrator, or flip-flop circuit, is provided with set and reset inputs and with $Q$ and $\overline{Q}$ outputs such that the Q output provides a binary "1" when the flip-flop circuit is set and the $\overline{Q}$ output provides a binary "1" when the flip-flop is reset. A monostable multivibrator, or one-shot circuit is adapted to produce a binary "1" for a given time interval whenever a binary "1" is applied thereto. Furthermore, it will be assumed that a binary "1" is represented by a DC level of relatively positive potential and a binary "0" is represented by a DC level of relative negative potential, or by ground potential.

As described hereinabove, the multiple cassette record and/or playback apparatus can be used to record information, such as in a dictation system, and can be used to reproduce prerecorded information, as in a home entertainment high fidelity audio system. In the event that this apparatus is to be used in a dictation system, such as in a central dictation system, a cassette changing cycle normally is initiated by applying a change pulse to an input terminal 212. Such a change pulse may be produced by apparatus of the type disclosed in copending application Ser. No. 722,141. When a cassette is loaded onto the record/playback deck and is driven in a forward direction, such as during dictation, playback, or fast-forward modes, suitable control apparatus (not shown) applies a forward signal represented by a binary "1" to an input terminal 222. As tape is transported between supply and take-up reels in a loaded cassette, chopper wheel 140 coupled to supply reel drive spindle 132 is driven, to periodically interrupt a light beam so as to apply sensor pulses to an input terminal 224. As mentioned above, the record/playback deck may be of the type disclosed in copending application Ser. No. 678,704, filed by James C. Whitney, on Apr. 20, 1976. Accordingly, the chopper wheel and light beam combination may be of the type disclosed in this copending application. Furthermore, when tape in a loaded cassette is transported either in a forward direction or in a rewind direction, a tape motion signal, represented as a binary "1" is applied to an input terminal 226.

As mentioned above, the multiple cassette record and/or playback apparatus is provided with various limit switches. These limit switches function to monitor the progress of the interdependent operation performed by the conveyor belt, the record/playback deck and the elevator. The signals produced by these various limit switches are applied to input terminals 254, 258, 261, 262, 316 and 336 as follows: When record/playback deck 126 is driven by deck motor 142 to its operative position, whereby a cassette is loaded thereon and adapted for a recording and/or playback operation, a binary "0" is applied to input terminal 254. At all other times, when deck 126 is not so positioned, a deck-not-down signal, represented as a binary "1" is applied to input terminal 254. Similarly, when deck 126 is driven to its unload position whereby a cassette can be withdrawn therefrom and a subsequent cassette can be loaded thereon, a binary "0" is applied to input terminal 258. At all other times when deck 126 is not in its unload position, a deck-not-up signal, represented as a binary "1" is applied to input terminal 258. Thus, a binary "0" is produced by each of limit switches 182, 184 when such limit switch is closed.

As mentioned above, limit switch 190 is adapted to be closed when a flight 114 contacts that switch. This represents that flight 114 is in proper position to subsequently withdraw a cassette from input stack 102 and transport that cassette to record/playback deck 126. Accordingly, when this limit switch is closed, a belt-in-position signal, represented as a pulse, is applied to input terminal 261. As may be appreciated, this pulse may be produced by a one-shot circuit, by a differentiator, or the like in response to the closing of limit switch 190.

Limit switch 180 is adapted to be closed when a cassette conveyed by conveyor belt 116 is brought into alignment with record/playback deck 126. Thus, limit switch 180 is closed to produce a cassette-in-position pulse when a cassette is suitably conveyed into position so as to be operatively loaded onto deck 126. This cassette-in-position pulse is applied to input terminal 262 and may be produced by, for example, a one-shot circuit, a differentiating circuit, or the like, energized in response to the closing of limit switch 180.

Limit switch 186 is adapted to be closed when elevator 162 is driven to its cassette receiving position from its output store load position. Thus, when the elevator returns to its "down" position, as viewed in FIG. 2, the closing of limit switch 186 applies a binary "1" to input terminal 316. As shown in FIG. 4, a capacitor 318 is connected in series with input terminal 316 to permit only a pulse coincident with the positive transition of this elevator-down signal to be transmitted. Similarly, when elevator 162 is driven to its output store load position from its cassette receiving position, limit switch 188 closes to supply an elevator-up signal, represented as a binary "1," to input terminal 336.

The aforedescribed input signals supplied to the respective input terminals illustrated in FIG. 4 are used to control deck drive motor 142, belt drive motor 120 and elevator drive motor 166 in accordance with a predetermined sequence such that the multiple cassette record and/or playback apparatus, shown in FIG. 1, undergoes a "change" cycle whereby a fresh cassette is loaded into deck 126 from input stack 102 and the cassette that had been processed in deck 126 is conveyed to and stored in output stack 152. The control system adapted to supervise this sequence of operation constituting the change cycle is comprised of a deck motor control circuit 210, a belt motor control circuit 270 and an elevator motor control circuit 300. Deck motor control circuit 210 includes a motor drive transistor 219 that is adapted to be supplied with a drive signal, whereby this transistor is turned on to drive circuitry, such as a relay, triac, or the like, to energize deck motor 142. Similarly, belt motor control circuit 270 includes a drive transistor 280 that is adapted to be supplied with a belt drive signal, whereby this transistor is turned on to energize belt motor 120. Also, elevator motor control circuit 300 includes a drive transistor 306 adapted to be supplied with an elevator drive signal, whereby this transistor is turned on to energize elevator drive motor 166. The respective deck, belt and elevator drive motors will operate continuously, provided a corresponding drive signal is supplied to its drive transistor.

Deck Motor Control Circuit

Deck motor drive transistor 219 is adapted to receive a drive signal from an OR gate 218, this OR gate having three inputs adapted to receive, respectively, a signal produced by a monostable multivibrator, or one-shot circuit 216 representing that a change cycle should be initiated, a signal produced by an AND gate 260 representing that deck 126 is intermediate its up and down, or unload and operative, positions, as determined by the deck-not-down and deck-not-up signals applied to input terminals 254 and 258, and a cassette-in-position signal supplied to input terminal 262. When OR gate 218 receives any one of these signals, a binary "1" drive signal is applied to deck motor drive transistor 219.

One-shot circuit 216 is actuated by an OR gate 214 which, in turn, is adapted to receive the change pulse applied to input terminal 212, or a signal produced by a tape jam detector circuit 220 representing a tape jam or other malfunction in the cassette then being processed by deck 126, or a load signal produced by manually closing a load switch 246 thereby to initiate a change cycle. Tape jam detector circuit 220 is adapted to detect the failure of movement of the supply reel included in a cassette being processed by deck 126. It may be assumed that, during forward movement of tape, as tape is pulled from the supply reel, this reel will rotate to correspondingly rotate the chopper wheel 140 (FIG. 1) coupled thereto. In the event that tape is jammed within the cassette or the end of the tape is reached, or the tape is severed, the supply reel, and thus the chopper wheel, will not rotate. This condition is sensed by a tape jam detector circuit 220 to supply a jam output signal to OR gate 214.

A detailed description of tape jam detector circuit 220 now follows. This circuit is comprised of an RC network formed of resistor 232 and capacitor 234 connected in series between input terminal 226 and a reference potential, such as ground. The tape motion signal applied to input terminal 226 is used to charge capacitor 234 through resistor 232. The junction defined by resistor 232 and capacitor 234 is coupled to input terminal 224 via inverter 236 and a negatively-poled diode 238. Thus, positive sensor pulses that are applied to input terminal 224 as chopper wheel 140 rotates while tape is moved in a cassette are inverted and used to periodically discharge capacitor 234. Alternatively, negative sensor pulses may be applied directly through diode 238 and inverter 236 can be omitted. Of course, in the event of a tape jam, or end of tape, or tape severance, sensor pulses no longer are applied to input terminal 224 and capacitor 234 thus is permitted to charge toward its maximum level. The voltage to which this capacitor is charged is supplied to threshold detector 230 via a resistor 240 to thus apply a binary "1" jam signal to an AND gate 228 when the voltage to which capacitor 234 is charged exceeds a predetermined threshold. If tape is being transported in the forward direction, such as during dictation, playback, or fast-forward, the forward signal applied to input terminal 222 conditions AND gate 228 to supply OR gate 214 with the jam signal.

A timer 250 is provided to determine whether the overall sequential operating cycle performed during a change operation is completed within a predetermined time. In the event that this sequential operating cycle is not so completed, timer 250 operates to prevent subsequent energization of any of the drive motors and, additionally, causes an indication by, for example, indicator 242, to apprise an operator of a possible malfunction. Timer 250 may include a charging capacitor coupled to an input 251 and capable of producing a time-out signal when input 251 receives an input signal for a predetermined time-out duration. A reset input 253 of timer 250 is coupled to load switch 246 to receive a reset signal in the event that a change cycle is manually initiated. This serves to reset the timer to a predetermined initial condition. In a preferred embodiment, timer 250 normally produces a binary "1", but when an energizing input signal is applied to input 251 for the predetermined time-out duration, this binary "1" is changed to a binary "0". The output of timer 250 is supplied through an inverter 211 to elevator motor control circuit 300 and, additionally, to another timer 259 for a purpose soon to become apparent. Timer 259 may be similar to timer 250 and is adapted to be reset by timer 250 when timer 250 is reset. Preferably, timer 259 is capable of producing a forced output signal substantially immediately after receiving a signal from an AND gate 311 to be described. The output of timer 259 is supplied to deck motor control circuit 210 (i.e., AND gate 260) and to belt motor control circuit 270. Also, this timer output is coupled through an inverter 249 to OR gate 244 and thence to indicator 242 to produce the aforementioned indication. As will soon become apparent, the use of two timers insures that the cassette-changer apparatus functions properly in the event that the supply of cassettes is depleted.

AND gate 260 included in deck motor control circuit 210 has a first input connected to receive the output signal from timer 259, a second input coupled to input terminal 254 to receive the deck-not-down signal and a third input coupled to input terminal 258 to receive the deck-not-up signal. During normal operation, timer 259, which may be similar to timer 250, produces a binary "1", thereby conditioning AND gate 260 to respond to the deck-not-down and deck-not-up signals applied thereto. Hence, the output of AND gate 260 is supplied as a binary "1" to OR gate 218 only when deck 126 is between its up, or cassette unload position, and its down, or operative, position. However, when a cassette is being processed by deck 126 AND gate 260 produces a binary "0" in response to the binary "0" supplied to input terminal 254. Similarly, when deck 126 attains its cassette unload position during a change operation, AND gate 260 produces a binary "0" in response to the binary "0" supplied to input terminal 258.

The deck-not-down signal, representing that a change operation is in progress, also is supplied to an AND gate 252 that normally is conditioned by the binary "1" produced by timer 259. Hence, a binary "1" is produced by AND gate 252 and supplied through an OR gate 256 to input 251 of timer 250 during the change operation. It is expected that, during normal operation of the apparatus, this signal produced by AND gate 252 will terminate at a time prior to the time-out duration defined by timer 250.

Belt Motor Control Circuit

Belt motor control circuit 270 is adapted to supply a drive signal to belt motor drive transistor 280 once deck 126 has been driven to its up, or cassette unload, position so that the cassette that had been processed by the deck can be conveyed to output store 152 and a fresh cassette can be conveyed from supply stack 102 to the record/playback station to be processed by the deck. In a preferred embodiment, belt motor control circuit 270 includes an AND gate 272 for producing the belt motor drive signal, this AND gate including an input coupled to timer 259 so as to be normally conditioned to respond to the signals applied to the remaining inputs thereof. Accordingly, another input of AND gate 272 is coupled through an inverter 274 to input terminal 258 so as to receive the deck-not-up signal. Yet another input of AND gate 272 is coupled through an inverter 276 to an OR gate 304 included in elevator motor control circuit 300 so as to receive the elevator motor drive signal. A still further input of AND gate 272 is coupled through inverter 278 to input terminal 262 so as to receive the cassette-in-position signal.

As may be appreciated, when deck 126 is driven to its cassette unload position, the binary "0" supplied to input terminal 258 is inverted by inverter 274 to actuate AND gate 272, thereby applying a drive signal to belt motor drive transistor 280. Hence, conveyor belt 116 is driven to convey the cassette that had been processed by the deck toward output store 152 and, concurrently, to convey a fresh cassette from input stack 102 toward the deck. When the fresh cassette is positioned properly at the record/playback station, the cassette-in-position pulse supplied to input terminal 262 is inverted by inverter 278 to de-energize AND gate 272. This terminates the belt drive signal and turns off belt motor drive transistor 280. It is recalled that the cassette-in-position signal also is supplied as a drive signal through OR gate 218 to deck motor drive transistor 219. Hence, deck 126 is driven from its cassette unload position toward its operative position. This is indicated by a deck-not-up signal supplied as a binary "1" to input terminal 258. Inverter 274 inverts this deck-not-up signal to inhibit AND gate 272 from turning on belt motor drive transistor 280 when the cassette-in-position pulse terminates.

Elevator Motor Control Circuit

Elevator motor control circuit 300 is adapted to supply a drive signal to elevator motor drive transistor 306 during a normal change operation, that is, when a just-processed cassette is conveyed by conveyor belt 116 from the record/playback station to output store 152 and, concurrently, a fresh cassette is conveyed from input stack 102 to the record/playback station; during a change cycle when input stack 102 is depleted of cassettes; and in the event of a detected malfunction of the changer apparatus. In one embodiment of elevator motor control circuit 300 capable of executing these functions, a flip-flop circuit 302 is provided with its set input coupled to an OR gate 308 and its Q output adapted to supply the drive signal to elevator motor drive transistor 306 through OR gate 304. The reset input of flip-flop circuit 302 is adapted to receive the elevator-down signal supplied to input terminal 316 via capacitor 318 and an OR gate 314. OR gate 314 includes another input coupled to an RC timing circuit 320 for a purpose soon to be described.

As shown, OR gate 308 includes a first input to receive the cassette-in-position signal applied to input terminal 262, and a second input coupled through a capacitor 312 and inverter 211 so as to receive a pulse signal in response to the time-out signal produced by timer 250. In addition to being supplied to OR gate 308 by capacitor 312, the output of inverter 211 is supplied to an AND gate 311 and to RC circuit 320. Another input of AND gate 311 is coupled to input terminal 261 so as to receive the belt-in-position signal, and the output of this AND gate is supplied to timer 259 to immediately "force" a time-out signal therefrom for a purpose soon to be described.

Priority Control

As described above in respect to FIG. 1, when the multiple cassette record and/or playback apparatus is used as a central dictation system, one advantageous feature is to designate a cassette as a "priority" cassette whereby, after recording thereon, this cassette immediately is ejected from the apparatus and, therefore, is not placed in order in output store 152. Since, during normal operation of the multiple cassette recording and/or playback apparatus, elevator 162 is in its down, or cassette-receiving position, so as to receive the recorded cassette conveyed thereto by conveyor belt 116, it is necessary, when the priority mode is selected, to raise elevator 162 to its up position. When this occurs, the cassette conveyed from the record/playback station passes beneath the raised elevator platform and is ejected from the apparatus via discharge chute 176. A priority control circuit 330 is adapted to drive elevator 162 toward its up position prior to the initiation of a change operation such that the cassette upon which information is dictated at the record/playback station may be conveyed to discharge chute 176 during the next change operation.

The priority control circuit includes a flip-flop circuit 332 having, for example, its set input coupled through an OR gate 338 to receive the elevator-up signal applied to input terminal 336. The reset input of flip-flop circuit 332 is connected to an input terminal 334 and is adapted to receive a priority signal produced in response to the selection of a priority mode of operation. The $\overline{Q}$ output of flip-flop circuit 332 is coupled through OR gate 304 to be supplied as a drive signal to elevator drive transistor 306. Additionally, the $\overline{Q}$ output of this flip-flop circuit also is supplied through OR gate 244 to a suitable indicator, such as indicator 242, to apprise an operator that the priority mode has been selected.

The elevator-up signal applied to input terminal 336, in addition to being supplied through OR gate 338 to flip-flop circuit 332, is supplied through a resistor 342 to an indicator 340 to provide an additional indication of the position of elevator 162. In one embodiment of the multiple cassette record and/or playback apparatus, it is preferred not to indicate that the elevator is in its up, or output store load position, during a normal change operation. Hence, the input to indicator 340 is coupled via a negatively-poled diode 344 to the $\overline{Q}$ output of flip-flop circuit 302. Thus, during a normal change operation, indicator 340 is not energized; but when a priority mode is selected, indicator 340 is energized when the elvator is driven to its up position.

Overall Operation of Electronic Control System

In order to simplify the description of the overall operation of the illustrated control system, particular conditions will be described separately. These conditions include a normal change operation, a change operation wherein the input supply of cassettes is depleted, operation in the event of a malfunction, and a priority operation.

Normal Change Operation

As mentioned above, a change signal, such as a change pulse signal, is applied to input terminal 212 when, for example, a preselected recording capacity of a cassette has been reached, as described in greater detail in copending application Ser. No. 722,141, or in the event that all of the prerecorded information on a cassette has been reproduced. This change signal is transmitted through OR gate 214 to energize one-shot circuit 216. Alternatively, if load switch 246 is manually closed, a comparable change signal is supplied through OR gate 214 to energize one-shot circuit 216. Also, the closing of load switch 246 insures that timer 250 is reset to properly time the duration of a change cycle, as will be described below. The energization of one-shot circuit 216 actuates OR gate 218 to supply a drive signal to deck motor drive transistor 219. In addition, energized one-shot circuit 216 actuates an oscillator 248 to apply an oscillating, or periodic, signal through OR gate 244 to a suitable indicator, such as indicator 242, thereby apprising an operator that a change cycle has been initiated. The drive signal produced by OR gate 218 turns deck motor drive transistor 219 ON, thereby energizing the deck motor.

Immediately prior to the energization of deck motor 142, deck 126 is in its operative position, thereby resulting in a binary "0" supplied to AND gate 260 from input terminal 254. Also, this binary "0" is applied as an inhibit signal to AND gate 252. Consequently, timer 250 produces a binary "1" and timer 259 also produces a binary "1". However, once deck motor 142 is energized, deck 126 is driven toward its up, or cassette unload, position, resulting in deck-not-down and deck-not-up signals applied to input terminals 254 and 258. Consequently, AND gate 260 is supplied with a binary "1" at each input and, therefore, functions to actuate OR gate 218 to continue the application of a drive signal to deck motor drive transistor 219 even after the pulse signal produced by energized one-shot circuit 216 terminates.

Now, the deck-not-down signal applied to input terminal 254 is supplied to AND gate 252, resulting in an activating signal supplied through OR gate 256 to input 251 of timer 250. Hence, timer 250 now commences operation to produce a time-out signal at the conclusion of its predetermined time-out duration, provided the signal applied to input 251 is not interrupted.

When deck 126 has been driven to its up, or cassette unload, position the binary "0" then applied to input terminal 258 de-energizes AND gate 260, resulting in a binary "0" at each input of OR gate 218. Thus, the drive signal applied to deck motor drive transistor 219 is interrupted and deck motor 142 is deenergized. At the same time, the binary "0" applied to input terminal 258 is inverted by inverted 274 such that AND gate 272 now is provided with a binary "1" at each of its inputs. More particularly, the input condition of AND gate 272 is as follows: The binary "1" from timer 259 is applied to one input of this AND gate; inverter 274 applies a binary "1" to another input of this AND gate, as just described; flip-flop circuit 302 is in its reset state and flip-flop circuit 332 is in its set state, as will be described, each supplying a binary "0" through OR gate 304 to be inverted and applied as a binary "1" to AND gate 272 by inverter 276; and the binary "0" normally applied to input terminal 262 is inverted by inverter 278 and applied as a binary "1" to the remaining input of the AND gate 272.

Thus, AND gate 272 produces a drive signal to turn ON belt motor drive transistor 280, whereby belt motor 120 is energized. Conveyor belt 116 then conveys the cassette that had been disposed at the record/playback station toward elevator 162 and, concurrently, the conveyor belt conveys a fresh cassette from input stack 102 toward the record/playback station.

During normal operation, the cassette conveyed from the record/playback station is driven onto elevator platform 162 and the fresh cassette is conveyed to its aligned position at the record/playback station, thereby closing limit switch 180 and supplying a cassette-in-position pulse to input terminal 262. This cassette-in-position pulse is transmitted through OR gate 308 to the set input of flip-flop circuit 302. In addition, the cassette-in-position pulse is inverted by inverter 278 to deenergize AND gate 272. This, in turn, terminates the drive signal applied to belt motor drive transistor 280, resulting in the de-energization of belt motor 120. Thus, conveyor belt 116 is arrested. Furthermore, the cassette-in-position pulse actuates OR gate 218 to supply a drive signal to deck motor drive transistor 219, thereby turning on this transistor and energizing deck motor 142.

At approximately the same time, flight 114b on conveyor belt 116 contacts limit switch 190 to supply the belt-in-position pulse to input terminal 261 and thence to AND gate 311. Since timer 250 has not, as yet, timed out, the binary "1" normally produced by the timer is inverted by inverter 211 to inhibit AND gate 311. Thus, this AND gate does not respond to the belt-in-position pulse.

Since flip-flop circuit 302 had been driven to its set state by the cassette-in-position pulse, a binary "1" is supplied from its Q output through OR gate 304 to elevator motor drive transistor 306. Hence, this transistor is turned ON and elevator motor 166 is energized. Also, the output of OR gate 304 is inverted by inverter 276 to maintain AND gate 272 in its de-energized condition. Thus, even after the cassette-in-position pulse terminates, belt motor 120 cannot be re-energized.

Thus, it is appreciated that, in response to the cassette-in-position pulse, deck motor 142 and elevator motor 166 both are energized to drive the deck from its up, or cassette unload, position toward its down, or operative, position, and to drive the elevator from its down, or cassette receiving, position, to its up, or output store load, position. Until deck 126 returns to its operative position, the binary "1" supplied to AND gate 252 as the deck-not-down signal maintains that AND gate in its energized condition so that timer 250 is capable of continuing in its time-out cycle. If deck 126 reaches its operative position prior to the time that elevator 162 can be fully cycled from its down, or cassette receiving, position to its up, or output store load, position, and then back to its down position, OR gate 304 nevertheless supplies a binary "1" through OR gate 256 to input 251 of timer 250. Hence, the timer energizing signal applied to input 251 is not interrupted even though deck 126 may reach its operative position to close limit switch 182 and apply a binary "0" to input terminal 254.

When elevator 162 is driven to its up, or output store load, position, the elevator-up signal applied to input terminal 336 is shunted by the forward-biased diode 344 and, therefore, is not capable of energizing indicator 340. This is because, since flip-flop circuit 302 is in its set state, a binary "0" is produced by its $\overline{Q}$ output to forward bias diode 344. Thus, the elevator-up signal is shunted through the forward biased diode and indicator 340 is not energized.

Since neither timer 250 has timed out nor elevator 162 has returned to its down, or cassette receiving, position, flip-flop circuit 302 is not reset. Consequently, the drive signal produced by OR gate 304 maintains elevator motor drive transistor 306 ON and elevator motor 166 remains energized. Therefore, the elevator continues to be driven through its complete cycle until returning to its down position whereupon the elevator-down signal is supplied to input terminal 316. The positive transition in this elevator-down signal, produced by the closing of limit switch 186, is supplied through capacitor 318 and OR gate 314 to reset flip-flop circuit 302. When this flip-flop circuit is reset, the signal produced at its Q output returns to a binary "0", thereby deactuating OR gate 304. This, in turn, terminates the drive signal applied to elevator motor drive transistor 306 and now interrupts the energizing signal that had been applied to input 251 of timer 250. This completes the cycle of sequential operation of deck motor 142, belt motor 120 and elevator motor 166. The multiple cassette record and/or playback apparatus now is conditioned for a subsequent recording or playback operation in conjunction with the fresh cassette now loaded onto deck 126. Also, at this time, OR gate 218 is supplied with a binary "0" by each of one-shot circuits 216, AND gate 260 and input terminal 262. AND gate 260 is de-energized to supply the binary "0" to OR gate 218 because input terminal 254 now is supplied with a binary "0" as a result of the closing of limit switch 182 by deck 126 which now is in its down, or operative, position. The binary "0" supplied to input terminal 254 also inhibits AND gate 252.

AND gate 272 is de-energized because of the binary "0" supplied thereto by inverter 274 in response to the deck-not-up signal (binary "1") provided at input terminal 258.

Since flip-flop circuit 302 was reset when elevator 162 was driven to its down, or cassette receiving, position, and since input terminal 262 is provided with a binary "0" and timer 250 has not timed out, OR gate 308 is not actuated to set flip-flop circuit 302 to its set state. Hence, the Q output of flip-flop circuit 302 applies a binary "0" to OR gate 304 to inhibit the actuation of this OR gate.

Therefore, each of deck motor drive transistor 218, belt motor drive transistor 280 and elevator motor drive transistor 306 is maintained OFF, whereby their corresponding motors are de-energized.

In the foregoing description of the change operation, it has been assumed that the sequential cycle is initiated by the change pulse signal applied to input terminal 212 or by manually closing load switch 246. This change operation also may be initiated by tape jam detector circuit 220 which may detect the jam, end or severance of the tape included in the cassette then being processed by deck 126. As described previously, in the event that the supply reel included in the cassette erroneously ceases to rotate, AND gate 228 actuates OR gate 214 to energize one-shot circuit 216.

The energization of one-shot circuit 216 initiates a change operation having the aforedescribed predetermined sequence of operation. Hence, the defective cassette is conveyed by conveyor belt 116 from the record/playback station to output stack 152 and, concurrently, a fresh cassette is conveyed from input stack 102 to the record/playback station for processing by deck 126.

To summarize, during a normal change operation, when initiated, deck 126 first is driven from its operative position to its cassette unload position. Then, conveyor belt 116 is driven to convey the just-processed cassette from the record/playback station to elevator 162 and, concurrently, to convey a fresh cassette from input stack 102 to the record/playback station. Then, elevator 162 is driven to load the processed cassette into output stack 152 while deck 126 is driven from its cassette unload position to its operative position. Finally, once elevator 162 returns to its cassette receiving position, the changer apparatus is prepared to perform a subsequent change operation.

Change Operation with Input Supply Depleted

Regardless of whether a supply of fresh cassettes is present in input stack 102, a change operation will be initiated in substantially the same manner as described above. Thus, OR gate 218 is actuated by one-shot circuit 216 to supply a drive signal to deck motor drive transistor 219. This energizes deck motor 142 to drive deck 126 from its operative position to its cassette unload position. While the deck is driven between these extreme positions, AND gate 260 is energized by the deck-not-shown and deck-not-up signals applied to input terminals 254 and 258, respectively. The energized AND gate maintains the actuation of OR gate 218 so as to continue to energize deck motor 142. Also, once the deck is driven from its down, or operative, position, AND gate 252 is energized to supply an energizing signal through OR gate 256 to input 251 of timer 250.

When deck 126 reaches its up, or cassette unload, position, the binary "0" then applied to input terminal 258 is inverted by inverter 274 to energize AND gate 272. This binary "0" also de-energizes AND gate 260 to deactuate OR gate 218. Thus, deck motor drive transistor 219 is turned OFF and belt motor drive transistor 280 is turned ON. Accordingly, the cassette which had been processed by deck 126 is conveyed from the record/playback station toward elevator 162 at output stack 152.

It is recalled that the energization of belt motor 120 continues until a cassette-in-position pulse signal is applied to input terminal 262. However, if input stack 102 is depleted of cassettes, limit switch 180 cannot close. Thus, the cassette-in-position pulse cannot be applied to input 262, AND gate 272 remains energized, and belt motor 120 continues to drive conveyor belt 116.

Also, since the cassette-in-position pulse is not received, deck motor drive transistor 219 is OFF and the deck-not-down signal is maintained at input terminal 254 to supply a conditioning binary "1" to AND gate 252. Consequently, AND gate 252 applies an energizing signal to input 251 of timer 250 through OR gate 256, and timer 250 now is permitted to complete its time-out cycle, whereupon a binary "0" time-out signal is produced and supplied to inverter 210 and timer 259. Timer 259 now commences its time-out cycle.

Inverter 211 responds to the binary "0" time-out signal produced by timer 250 to, in turn, produce a binary "1". The positive transition in the output of inverter 210 is coupled by capacitor 213 to OR gate 308 so as to set flip-flop circuit 302. Accordingly, OR gate 304 is actuated to turn ON elevator motor drive transistor 306, thereby energizing elevator motor 166, and to de-energize AND gate 272 so as to turn belt motor drive transistor 280 OFF. Hence, the cassette that had been conveyed to the elevator now is loaded into output stack 152. When elevator 162 returns to its down, or cassette receiving, position, the positive transition in the elevator-down signal applied to input terminal 316 is coupled through OR gate 314 by capacitor 318 so as to reset flip-flop circuit 302 and turn off elevator motor drive transistor 306. Thus, the last cassette that had been processed by deck 126 is, nevertheless, stored in the output stack.

In the event that elevator 162 or elevator motor 166 malfunctions, or because of a cassette jam the elevator does not return to its down, or cassette receiving position, flip-flop circuit 302 nevertheless is reset. More particularly, the binary "1" produced by inverter 211 when timer 250 times out rapidly charges the capacitor included in RC network 320 to a level corresponding to a binary "1". This charged level is supplied through OR gate 314 to reset flip-flop circuit 302.

Hence, even if input stack 102 is depleted of cassettes, the illustrated apparatus will function to remove the last-processed cassette from deck 126, continue to operate until timer 250 times out, and the load that cassette into output stack 152. When timer 250 times out, the respective deck motor control circuit 210, belt motor control circuit 270 and elevator motor control circuit 300 will be conditioned to load a fresh cassette onto deck 126 once input stack 102 is replenished and load switch 246 is closed.

The binary "1" produced by inverter 211 when timer 250 times out also is applied to AND gate 311. Although AND gate 272 is de-energized while elevator 162 loads the last-processed cassette into output stack 152, this AND gate is re-energized to turn belt motor drive transistor 280 ON when flip-flop circuit 302 is reset, provided timer 259 has not timed out. Now, conveyor belt 116 again is driven until it is in proper position to withdraw a fresh cassette from subsequently resupplied input stack 102, at which position the belt-in-position pulse is applied to input terminal 261. Accordingly, AND gate 311 is energized to apply a binary "1" to timer 259, whereupon this timer is forced to its time-out condition to apply a binary "0" to AND gate 272, thereby turning belt motor drive transistor 280 OFF.

In addition to inhibiting AND gate 272 the binary "0" time-out signal from timer 259 also is inverted by inverter 249 to energize a suitable indicator, thereby to apprise an operator of the depletion of input stack 102. In one embodiment, the output of inverter 249 may be supplied by OR gate 244 to indicator 242.

Furthermore, when timer 259 produces its time-out signal, AND gate 252 is de-energized and the timer energizing signal applied to input 251 of timer 250 is terminated.

In the event of a malfunction in belt motor control circuit 270 or in elevator motor control circuit 300, or because of a cassette jam in the elevator or some other misoperation with respect to conveyor belt 116, the belt-in-position pulse may not be produced. Nevertheless, timer 259 will continue in its time-out cycle to produce its binary "0" time-out signal.

To summarize, when input stack 102 is depleted of cassettes, the next change operation that is performed results in conveying the last-processed cassette from the record/playback station to elevator 162. Since a fresh cassette cannot be conveyed to the record/playback station, deck 126 is not driven to its operative position, and belt motor 120 remains energized until timer 250 times out. This de-energizes the belt motor and energizes elevator motor 166 to load the last-processed cassette into the output stack. Then belt motor 120 is reenergized until belt 116 reaches a predetermined position; whereupon the respective motor control circuits are reset to their initial conditions whereby they are prepared for re-use when input stack 102 is replenished.

When input stack 102 is replenished with cassettes, deck 126 is loaded with the bottom-most cassette in response to the closing of load switch 246. That is, when the load switch is closed, a binary "1" is applied to reset input 253 of timer 250. This resets timer 250 which, in turn, resets timer 259. Hence, AND gate 272 is energized because a binary "1" is received from timer 259, a binary "1" is received from inverter 274 in response to the binary "0" deck-not-up signal (deck 126 remaining in its up position following the last change operation), a binary "1" is received from inverter 276 (flip-flop circuit 302 having been reset at the conclusion of the last change operation), and a binary "1" is received from inverter 278 (the cassette-in-position pulse is not yet produced). Therefore, belt motor 120 is energized to drive belt 116 to convey a fresh cassette to the record/playback station. Although the binary "1" produced by the closing of load switch 246 is supplied to OR gate 214, a diode 215 coupled to the output of the OR gate is forward biased by the binary "0" deck-not-up signal so as to shunt the output of the OR gate and thus prevent one-shot circuit 216 from being energized. Consequently, deck motor drive transistor 219 is not turned ON while belt 116 is driven. Of course, when belt 116 conveys a fresh cassette to the record/playback station so that the cassette-in-position pulse is applied to input terminal 262, belt motor drive transistor 280 is turned OFF to de-energize belt motor 120 and deck motor drive transistor 219 is turned ON to energize the deck motor in the manner described in detail hereinabove.

Operation in the Event of a Malfunction

As described above, the operation of the respective deck, belt and elevator motors is dependent upon sensing the progress of a change operation as represented by selected signals produced by the limit switches. Furthermore, the operation of these motors is interdependent and is established to be performed in accordance with the aforedescribed sequence. Consequently, if a malfunction occurs such that one of the necessary monitor signals is not produced, the complete change operation cannot be performed in its entirety. Some of the malfunction conditions that can result in an incomplete change operation includes (but are not limited to) the following: (a) a cassette is stored in input stack 102 in backward configuration; (b) a cassette is not properly transported onto elevator platform 162; and (c) one or more of the deck, belt or elevator motors, or one or more of deck 126, conveyor belt 116, or elevator 162 itself jams or undergoes a misoperation or failure. Of course, other potential malfunction conditions may occur, however, it is believed that the foregoing merely are illustrative and will serve to demonstrate the operation of the illustrated apparatus in the event of such a malfunction.

(a) Cassette loaded backward: A conventional cassette is arranged with an asymmetrical configuration. That is, such a cassette can be loaded onto, for example, a record and/or playback deck, such as deck 126, only when the cassette exhibits a predetermined disposition, such as shown in FIG. 1. In this disposition, reel drive spindles 132, 134 on deck 126 will be inserted through apertures 113a, 113b and heads 128, 130, capstan 136 and pinch roller 138 on deck 126 will engage tape within the cassette. If the cassette exhibits a backward disposition, apertures 113a, 113b will be misaligned and will not receive the reel drive spindles. Also, the heads, capstan and pinch roller on deck 126 will not be capable of engaging tape within the cassette.

Thus, when a cassette is stored in input stack 102 in backward configuration, deck 126 will not be able to assume its operative position when this cassette is conveyed to the record/playback station by conveyor belt 116. Consequently, a deck-not-down binary "1" will be applied always to input terminal 254. This signal will not change to a binary "0" because limit switch 182 will not be closed by deck 126. Accordingly, deck motor drive transistor 219 remains turned on to continue the energization of deck motor 142. Preferably, a protective coupling is provided between deck motor 142 and deck 126. Thus, while deck motor 142 remains energized, deck 126 is returned to its cassette unload, or up, position. In the manner described hereinabove, when deck 126 reaches its cassette unload position, belt motor control circuit 270 energizes belt motor 120 so that conveyor belt 116 conveys this cassette from the record/playback station toward elevator 162, while concurrently conveying a fresh cassette from input stack 102 toward the record/playback station. Then, elevator motor control circuit 300 energizes elevator motor 166 to load this received cassette into output stack 152. At the same time, deck motor control circuit 210 drives deck 126 toward its operative position so that the fresh cassette can be processed.

Thus, in the event that a backward cassette is conveyed to the record/playback station during a change operation, essentially a second change operation is performed to promptly remove that cassette and to furnish the record/playback station with a fresh, presumably properly disposed, cassette, Preferably, the predetermined time-out duration of timer 250 is greater than the time required for the illustrated apparatus to undergo two change operations. Hence, it is assumed that timer 250 does not produce its time-out signal.

(b) Cassette not properly transported onto elevator platform: Let it be assumed that, because of some disturbance either to the cassette, or to conveyor belt 116 or to the illustrated changer apparatus, the cassette conveyed from the record/playback station to elevator 162 is not loaded properly onto the elevator platform. Because of this, flip-flop circuit 302, once set, will not be reset. This is because an elevator-down signal will not be applied to input terminal 316. Hence, OR gate 304 remains actuated to continue the energization of elevator 162. Also, this output from OR gate 304 is transmitted through OR gate 256 to input 251 of timer 250. Therefore, timer 250 is enabled to complete its time-out cycle, and produce the time-out signal. As described previously, this signal actuates timer 259 and also, after inversion by inverter 211, charges the capacitor included in RC network 320. Accordingly, elevator motor 166 remains energized until flip-flop circuit 302 is reset by RC network 320. Furthermore, when timer 259 has timed out to produce the binary "0" time-out signal, a suitable indication of this malfunction condition is provided.

(c) Malfunction of a motor or motor-driven member: It is appreciated that an input signal is applied to input 251 of timer 250 for the continuous period during which a change operation is performed. That is, when deck motor 142 first is energized, the deck-not-down signal produced by the opening of limit switch 182 energizes AND gate 252 to, in turn, actuate OR gate 256 to supply the timer energizing input signal to input 251. Even after deck 126 returns to its down, or operative position, the timer energizing signal is not interrupted until OR gate 304 is deactuated to turn off elevator motor drive transistor 306 and thus de-energize elevator motor 166. However, if a malfunction occurs such that deck 126 is not returned to its down, or operative position, AND gate 252 remains energized continuously, thereby enabling timer 250 to complete its time-out operation. This may occur if a malfunction occurs in deck 126 or if conveyor belt 116 is not driven fully to properly align a fresh cassette at the record/playback station so that a cassette-in-position pulse is not produced. Even if deck 126 returns to its down, or operative position, timer 250 may continue to complete its time-out operation in the event that flip-flop circuit 302 is not reset, for example, because of a failure of elevator motor 166 or because of some other malfunction in the elevator or output stack structure.

Of course, once timer 250 completes its time-out operation, timer 259 commences to time out, resulting in an indication of a malfunction condition and, moreover, in preventing the performance of a subsequent change operation, as described above, until the malfunction condition is corrected and timer 250 is reset, as by closing load switch 246. Also, when timer 250 completes its time-out operation, flip-flop circuit 302 is reset by RC network 320 in the manner described above. Thus, since a malfunction condition will prevent the sequential cycle constituting a change operation from being completed within the predetermined time-out duration of timer 250, a subsequent change operation is inhibited until this malfunction condition is corrected.

Priority Operation

As described above, if a particular cassette, designated a "priority" cassette, is to be immediately ejected from the apparatus so as, for example, to be transcribed as soon as possible, it should not be loaded into output stack 152. Rather, this priority cassette is ejected through discharge chute 176. To accomplish this ejection, elevator platform 162 must be raised to its up position before a change operation is initiated. This is achieved by applying a priority signal to input terminal 344 by, for example, an operator who selects the priority mode of operation. This priority signal resets flip-flop circuit 332 to provide a binary "1" at its $\bar{Q}$ output. This binary "1" actuates OR gate 304 to turn on elevator motor drive transistor 306 and thereby energize elevator motor 166. Hence, before the change operation is initiated, elevator platform 162 is driven to its up position. Once this position is attained, the elevator-up signal applied to input terminal 336 actuates OR gate 338 and returns flip-flop circuit 332 to its set condition. This, of course, de-energizes elevator motor 166, thus retaining elevator platform 162 at its up position.

Since a change operation has not yet been initiated, flip-flop circuit 302 remains in its reset state. Hence, a binary "1" is provided at its $\bar{Q}$ output. Therefore, the elevator up signal is applied through resistor 342 to energize indicator 340. At this time, diode 344 is reverse biased because of the binary "1" provided at the $\bar{Q}$ output of flip-flop circuit 302. Therefore, a suitable indication of the selection of the priority mode of operation is furnished.

When a change operation is initiated after this priority mode has been selected, the respective deck motor control circuit 210 and belt motor control circuit 270 operate in the manner described hereinabove. However, it is appreciated that the priority cassette that is conveyed from the record/playback station by conveyor belt 116 is not driven onto elevator platform 162. Rather, it is ejected through discharge chute 176 under the influence of gravity. Therefore, when a cassette-in-position pulse is applied to input terminal 262 so as to set flip-flop circuit 302, elevator motor 166 is energized in the usual manner, but now drives elevator platform 162 from its up position (established by the selected priority mode) to its down position. Once this down position is reached, the positive transition in the elevator-down signal applied to input terminal 316 is coupled by capacitor 318 to OR gate 314 so as to reset flip-flop circuit 302. Hence, the illustrated apparatus now is conditioned to permit deck 126 to proceed with a record and/or playback operation on the fresh cassette that had been loaded thereon; and then subsequently to perform another change operation in the manner discussed in detail hereinabove.

In the event that a malfunction occurs in elevator motor 166 or in the elevator apparatus such that after the priority signal is applied to input terminal 344 elevator 162 is not driven to its up position, flip-flop circuit 332 will remain in its reset state. However, because of this malfunction condition, when the change operation is initiated, the reset state of flip-flop circuit 332 applies a binary "1" through OR circuits 304 and 256 to timer 250 which will be energized to complete its time-out operation, as discussed above. Consequently, belt motor 120 will remain de-energized so that the aforementioned belt-in-position signal will not be produced; but timer 259 will subsequently time out to produce a binary "0". This binary "0" is inverted by inverter 339 and supplied through OR gate 338 to set flip-flop circuit 332. This insures that priority control circuit 330 will be restored to its proper, initial state, even after a malfunction is detected.

Slack Take-up

There is the possibility that the tape in a fresh cassette conveyed from input stack 102 to the record/playback station may be stored loosely within the cassette housing. Thus, when a record and/or playback operation commences, this slack in the tape first must be taken up. However, the jam detector circuit 220 described hereinabove may erroneously sense the occurrence of a jam or tape severance condition while this slack is being taken up. This is because the tape in the cassette will be driven onto the take-up reel but, until all of the slack is taken up, the supply reel will not rotate. Thus, sensor pulses will not be applied to input terminal 224 and, consequently, capacitor 234 soon will charge to a sufficient level to energize AND gate 228 to produce a jam signal.

Therefore, to avoid this occurrence of an erroneous indication of a jam condition merely because the tape in a fresh cassette is loosely stored therein, slack take-up control circuit 350 is provided. More particularly, this circuit functions to control deck 126 to operate in a fast-forward tape take-up mode for a predetermined time interval immediately after the deck is driven to its operative position relative to a fresh cassette conveyed thereto. As shown in FIG. 4, slack take-up control circuit 350 includes a capacitor 352 having one electrode, or plate, coupled to input terminal 254 by an inverter 354 and having its other electrode, or plate, coupled through a resistor 356 to an amplifier 364. In the illustrated embodiment, amplifier 364 is an operational amplifier, preferably a current mode amplifier such as a Norton operational amplifier of a type similar to model LM3900 manufactured by National Semiconductor of California, whose inverting input terminal is coupled to the capacitor. A diode 358 is coupled to the junction defined by capacitor 352 and resistor 356 and is poled to limit the minimum voltage applied to capacitor 352 to ground potential.

The non-inverting input of amplifier 364 is coupled to a source of positive operating potential by a resistor 366. Additionally, a feedback resistor 368 is interconnected between the amplifier output and its non-inverting input.

A capacitor 360 includes one electrode, or plate, coupled to input terminal 224 to receive the sensor pulses described hereinabove. The other electrode, or plate, of capacitor 360 is coupled via diode 362 to capacitor 352.

In operation, when deck 126 is driven to its down position, a binary "0" is applied to input terminal 254 and is inverted by inverter 354. The resultant positive transition in the binary "1" produced by this inverter is coupled through capacitor 352 and resistor 356 to the inverting input of amplifier 364 and initially charges capacitor 352. If it is assumed that the current supplied by capacitor 352 to the inverting input is greater than the current applied to the non-inverting input of this amplifier, then a relatively negative voltage level appears at the output of amplifier 364, as shown. This relatively negative voltage level is applied to the fast-forward control (not shown) of deck 126 so as to commence a fast-forward tape take-up operation.

It is assumed that soon after this fast-forward operation commences, slack in the tape stored in the cassette will be taken up and the chopper wheel will begin to rotate. Hence, negative sensor pulses (as from inverter 236) then will be supplied through capacitor 360 and diode 362 to incrementally discharge capacitor 352. When a sufficient number of such sensor pulses has been so applied, for example, after three or four such pulses, the voltage to which capacitor 352 had been charged now will be discharged to supply a current less than the current level applied to the non-inverting input of amplifier 364. At that time, amplifier 364 will produce a relatively positive voltage level at its output, as shown, and this will terminate the fast-forward operation. Thus, the fast-forward operation will be performed for an interval corresponding to the duration of the relatively negative voltage level produced by amplifier 364. The amount of useful tape consumed by this fast-forward operation is minimal in comparison with the total length of tape stored in the cassette. Thus, the possibility of erroneously detecting a jam merely because of slack in the tape stored in the cassette is avoided.

In the event that there is a tape jam during this fast-forward operation, or if the tape actually is severed, it is appreciated that sensor pulses will not be applied to input terminal 224 to discharge capacitor 352. Nevertheless, this capacitor will discharge within a finite time because of the inherent leakage resistance thereof and because of the discharge path through resistor 356. Thus, even if sensor pulses are not received, the fast-forward operation will terminate at the conclusion of this finite time duration.

While the present invention has been shown and described in conjunction with a preferred embodiment thereof, it should be readily apparent that various modifications in form and details may be made without departing from the spirit and scope of the invention. For example, various alternative logic circuits can be used to perform the equivalent operations discussed hereinabove. Preferably, the logic circuitry is constructed of the so-called C-MOS integrated circuitry so that discrete circuit components can be used advantageously therewith, as shown. Similarly, although drive transistors have been shown and described, it is contemplated that various equivalent drive elements, such as SCR devices, integrated circuit drive elements, or the like, can be used. Furthermore, the source of motive power for deck 126, conveyor belt 116, and elevator 162 may be formed of individually energizable motors, as shown, or may be formed of a single motor having individually energizable transmissions or clutch members to transfer the motive power developed by that single motor to the deck, conveyor belt and elevator, respectively.

Therefore, it is intended that the appended claims be interpreted as including the foregoing as well as various other similar modifications and changes.

What is claimed is:

1. In multiple cassette record and/or playback apparatus of the type having a supply of tape cassettes, motor driven means for conveying individual cassettes from said supply to a record/playback station and thence to an output store, said record/playback station having motor driven means for loading a conveyed cassette for a record and/or playback operation and said output store having motor driven means for loading a conveyed cassette in said output store, an electronic control system for controlling said apparatus, comprising:

drive means for driving all of said motor driven means through an operating cycle;

monitor means for monitoring the operation of each of said motor driven means to sense when a cassette has been conveyed to said record/playback station, when a cassette has been loaded for a record and/or playback operation and when a cassette has been loaded in said output store;

sequence control means responsive to said monitor means for energizing said drive means in a predetermined sequential cycle; and timing means for detecting whether said sequential cycle is completed within a predetermined time and for preventing the initiation of another sequential cycle in the event that said sequential cycle has not been so completed.

2. The electronic control system of claim 1 wherein said monitor means includes a plurality of sensor means including first sensor means for producing a first sense signal when said cassette is in predetermined alignment at said record/playback station; second sensor means for producing a second sense signal when said cassette is operatively loaded at said record/playback station for a record and/or playback operation and a third sense signal when said cassette is unloaded from said record/playback station; and third sensor means for producing a fourth sense signal when said output store is conditioned to receive a conveyed cassette.

3. The electronic control system of claim 2 wherein said sequence control means comprises means responsive to said first, second, third, and fourth sense signals for energizing said drive means in an order such that said motor driven loading means unloads a cassette from said record/playback station, said motor driven conveying means conveys said unloaded cassette to said output store and simultaneously conveys a fresh cassette from said supply to said record/playback station, said motor driven output store loading means loads said unloaded cassette in said output store, and said motor driven loading means loads said fresh cassette in said record/playback station substantially simultaneously with said motor driven output store loading means.

4. The electronic system of claim 3 wherein said multiple cassette record and/or playback apparatus includes means for supplying an initial energizing signal to said drive means to drive said motor driven loading means and thereby initiate said sequential cycle, said motor driven loading means being driven until said third sense signal is produced; and wherein said means responsive to said first, second, third, and fourth sense signals includes,
- third sense signal responsive means for energizing said drive means to interrupt said motor driven loading means and to drive said motor driven conveying means when said third sense signal is produced,
- first sense signal responsive means for energizing said drive means to interrupt said motor driven conveying means and to resume the driving of said motor driven loading means simultaneously with the driving of said motor driven output store loading means, the latter being driven through a full operating cycle when said first sense signal is produced, and
- fourth sense signal responsive means for energizing said drive means to interrupt said motor driven output store loading means when said fourth sense signal is produced;
- and wherein said third sense signal responsive means also is responsive to said second sense signal for energizing said drive means to interrupt said motor driven loading means.

5. The electronic control system of claim 4 wherein said monitor means further includes fourth sensor means for producing a fifth sense signal when said motor driven conveying means is at a predetermined location; and wherein said means responsive to said first, second, third, and fourth sense signals also is responsive to said fifth sense signal and further includes timing means for energizing said drive means to interrupt said motor driven conveying means and to drive said motor driven output store loading means in the event that a fresh cassette is not conveyed to said record/playback station within a predetermined time, said motor driven output store loading means being driven until said fourth sense signal is produced, whereupon said motor driven conveying means is driven again until said fifth sense signal is produced.

6. The electronic control system of claim 5 wherein said timing means has an input terminal coupled to said drive means for receiving a timing signal therefrom when any of said motor driven means are driven and an output terminal for producing an output signal if said timing signal had been received for a predetermined time, said predetermined time being greater than the total time for said motor driven means to be driven through their operating cycles; and wherein said sequence control means further includes means for detecting the coincidence of said output signal and said fifth sense signal for inhibiting said drive means from further driving said motor driven conveying means.

7. The electronic control system of claim 2 wherein said motor driven conveying means comprises a conveyor belt and a belt motor coupled to said belt; said motor driven loading means comprises a movable record/playback deck and a deck motor coupled to said deck for moving said deck between a loaded position, operative to record on and/or play back information from a cassette loaded on said deck, and an unloaded position; and said motor driven output store loading means comprises elevator means and an elevator motor coupled to said elevator means for moving said elevator means between a cassette receiving position and a loaded position whereby a received cassette is loaded into said output store; and further comprising means for initiating said predetermined sequential cycle through which said drive means is energized.

8. The electronic control system of claim 7 wherein said first sensor means comprises first switch means disposed at said record/playback station to produce said first sense signal when a cassette is conveyed by said conveyor belt into alignment with said record/playback deck; said second sensor means comprises second switch means to produce said second sense signal when said record/playback deck moves to its loaded position and third switch means to produce said third sense signal when said record/playback deck moves to its unloaded position; and said third sensor means comprises fourth switch means to produce said fourth sense signal when said elevator means moves to its cassette receiving position; and further including fifth switch means disposed at a predetermined location adjacent said conveyor belt to produce a fifth sense signal when said conveyor belt advances to a predetermined position.

9. The electronic control system of claim 8 wherein said drive means comprises belt motor drive means actuable to apply an energizing signal to said belt motor; deck motor drive means actuable to apply an energizing signal to said deck motor; and elevator motor drive means actuable to apply an energizing signal to said elevator motor.

10. The electronic control system of claim 9 wherein said sequence control means comprises:
- means for actuating said deck motor drive means at the termination of a record and/or playback operation, whereby said deck is moved from its loaded position to its unloaded position;
- deck motor control means responsive to said third sense signal for deactuating said deck motor drive means;
- belt motor control means responsive to said third sense signal for actuating said belt motor drive means, whereby the cassette at said record/playback station is conveyed toward said elevator means and a fresh cassette is removed from said supply and conveyed toward said record/playback station; said belt motor control means being responsive to said first sense signal for deactuating said belt motor drive means; and
- elevator motor control means responsive to said first sense signal for actuating said elevator motor drive means, whereby said elevator means loads the cassette conveyed thereto into said output store and then returns to its cassette receiving position; said elevator control means being responsive to said fourth sense signal for deactuating said elevator motor drive means;
- said deck motor control means being responsive to said first sense signal for actuating said deck motor drive means, whereby said deck is moved from its unloaded position to its loaded position; and said belt motor control means normally being inhibited in the absence of said third sense signal.

11. The electronic control system of claim 10 wherein said belt motor control means comprises coincidence means for receiving said first sense signal, said third sense signal and a signal representing that said elevator motor drive means is actuated to supply an actuating signal to said belt motor drive means when said third sense signal is received and said first sense signal and said representing signal are not received, and to inhibit said actuating signal at other times.

12. The electronic control system of claim 11 wherein said elevator motor control means comprises switch means having first input means for receiving said first sense signal, so as to supply an actuating signal to said elevator motor control means, and second input means for receiving said fourth sense signal so as to terminate said actuating signal.

13. The electronic control system of claim 12 wherein said deck motor control means comprises switch means including first input means for receiving a signal representing the termination of a record and/or playback operation and also receiving said first sense signal for supplying an actuating signal to said deck motor drive means in response to either of said received signals; and second input means for receiving said second and third sense signals to terminate said actuating signal in response to either of said second or third sense signals.

14. The electronic control system of claim 12 further comprising:
a timer having an input terminal for receiving a signal applied thereto and an output terminal for producing a time-out signal if said applied signal is received for at least a predetermined time;
input means coupled to said input terminal and selectively responsive to said signal representing that said elevator drive motor means is actuated or to a signal representing that said record/playback deck is not in its loaded position for applying said signal to said input terminal, said applied signal having a duration exceeding said predetermined time in the event that said first sense signal is not produced, such as when said supply of cassettes is exhausted; and
inhibit means responsive to said time-out signal to subsequently terminate all actuating signals and to disable each said deck motor control means, said belt motor control means and said elevator motor control means.

15. The electronic control system of claim 12 wherein said third sensor means further includes sixth switch means to produce a sixth sense signal when said elevator means moves to its loaded position; and wherein said elevator motor control means further comprises additional switch means responsive to a predetermined signal for supplying said actuating signal to said elevator motor control means and responsive to said sixth sense signal for terminating said actuating signal; whereby said elevator means does not return to its cassette receiving position so that when said conveyor belt conveys a cassette from said record/playback station, said cassette is not loaded into said output store.

16. A multiple cassette record and/or playback apparatus having a supply of tape cassettes, a record/playback station whereat information is recorded on and/or played back from a cassette, and an output store for storing cassettes, comprising:
a conveyor belt for conveying individual cassettes from said supply to said record/playback station;
conveyor belt drive means for driving said conveyor belt;
a record/playback deck pivotally disposed at said record/playback station for recording information on and/or playing information back from a cassette at said record/playback station;
deck drive means for pivoting said deck from a first loading/unloading position to a second operating position and then, subsequently, from said second operating position to said first loading/unloading position to permit a cassette to be unloaded from said deck;
an elevator disposed at said output store for receiving a cassette conveyed thereto from said record/playback station by said conveyor belt for loading said received cassette into said output store;
elevator drive means for driving said elevator from a cassette receiving position to a load position so that said received cassette is loaded into said output store, and then subsequently to drive said elevator from said load position to said cassette receiving position so that another cassette can be received;
monitor means for monitoring the operation and progress of said respective drive means and for producing representative signals thereof;
control means for controlling said respective drive means in accordance with a predetermined sequence of operation in response to signals supplied thereto by said monitor means, whereby a cassette is conveyed from said supply to said record/playback station, said deck is pivoted from said loading/unloading position to said operating position, information is recorded on and/or played back from said cassette, said deck is pivoted from said operating position to said loading/unloading position, said cassette is conveyed from said record/playback station to said elevator, and said cassette is loaded into said output store; and
timing means for detecting if said predetermined sequence of operation is not completed within a predetermined time interval.

17. The apparatus of claim 16 wherein said control means includes detecting means for detecting a malfunction in a record and/or playback operation, thereby to initiate said predetermined sequence of operation of said respective drive means.

18. The apparatus of claim 17 further comprising means to operate said record/playback deck in a fast-forward tape transport mode initially when said deck is pivoted to said operating position from said loading/unloading position to avoid an erroneous malfunction detection in the event that the tape in said cassette conveyed to said record/playback station is slack.

19. The apparatus of claim 16 wherein said monitor means comprises:
first means for producing a cassette-in-position signal when said cassette is conveyed to said record/playback station in proper alignment to be operated upon by said deck;
second means for producing a deck-loaded signal when said deck is pivoted to its operating position;
third means for producing a deck-unloaded signal when said deck is pivoted to its loading/unloading position; and
fourth means for producing an elevator-ready signal when said elevator is in its cassette receiving position.

20. The apparatus of claim 19 further comprising means for supplying a start signal to initiate said predetermined sequence of operation; and wherein said deck drive means comprises first gate means for producing a deck drive signal in response to said start signal, for interrupting said deck drive signal in response to said deck-unloaded signal, for resuming said deck drive signal in response to said cassette-in-position signal, and for interrupting said deck drive signal in response to said deck-loaded signal.

21. The apparatus of claim 20 wherein said conveyor belt drive means comprises second gate means for producing a belt drive signal in response to said deck-unloaded signal and for terminating said belt drive signal in response to said cassette-in-position signal, said second gate means additionally being inhibited from producing said belt drive signal when said elevator is driven.

22. The apparatus of claim 21 wherein said elevator drive means comprises third gate means for producing an elevator drive signal in response to said cassette-in-position signal and for terminating said elevator drive signal when said elevator-ready signal is produced.

23. The apparatus of claim 22 wherein said third gate means comprises bistate means having a first state for producing said elevator drive signal and a second state for terminating said elevator drive signal; a first OR-gate for driving said bistate means to said first state in response to said cassette-in-position signal or to the detection of said timing means that said predetermined sequence of operation is not completed within said predetermined time interval; and a second OR-gate for driving said bistate means to said second state in response to said elevator-ready signal or to said timing means detection following a predetermined delay.

24. A multiple cassette record and/or playback apparatus having a supply of tape cassettes, a record/playback station whereat information is recorded on and/or played back from a cassette, and an output store for storing cassettes, comprising:

conveyor means for conveying a cassette from said supply to said record/playback station and for simultaneously conveying a cassette from said record/playback station to said output store;

loading means for loading a cassette into said output store;

a conveyor motor selectively energizable to drive said conveyor means;

a loading motor selectively energizable to drive said loading means;

conveyor sensing means for sensing when a cassette has been conveyed from said supply to an operative position at said record/playback station to enable information to be recorded on and/or played back from said cassette;

load sensing means for sensing when said loading means is loading a cassette into said output store and when the loading operation is completed;

conveyor motor energizing means responsive to a predetermined condition for energizing said conveyor motor to drive said conveyor means so as to convey a cassette from said supply to said record/playback station and to convey a cassette from said record/playback station to said loading means, said conveyor motor energizing means being responsive to said conveyor sensing means to de-energize said conveyor motor;

loading motor energizing means responsive to said conveyor sensing means for energizing said loading motor to drive said loading means so as to load a cassette into said output store, said loading motor energizing means being responsive to said load sensing means for de-energizing said loading motor when said loading operation is completed; and means for providing an indication in the event that a cassette is not in said operative position or that a loading operation is not completed within a predetermined time interval.

25. A multiple cassette record and/or playback apparatus having a supply of tape cassettes, a record/playback deck for recording information on and/or playing information back from a cassette, and an output store for storing cassettes, comprising:

conveyor means for conveying a cassette from said supply to said record/playback deck and for simultaneously conveying a cassette from said record/playback deck to said output store;

means for placing a cassette in operative relation with respect to said record/playback deck;

means for loading a cassette into said output store;

a conveyor motor selectively energizable to drive said conveyor means;

conveyor sensing means for sensing when a cassette has been conveyed from said supply to said record/playback deck;

deck sensing means for sensing when said cassette is in an operative relation with respect to said record/playback deck for information to be recorded on and/or reproduced from said cassette; load sensing means for sensing when said loading means is loading a cassette into said output store and when the loading operation is completed;

conveyor motor energizing means for energizing said conveyor motor to drive said conveyor means so as to convey a fresh cassette from said supply to said record/playback deck and to convey a used cassette from said record/playback deck to said loading means, said conveyor motor energizing means being responsive to said conveyor sensing means to de-energize said motor;

load energizing means responsive to said conveyor sensing means for energizing said loading means when said conveyor motor is de-energized, said load energizing means being responsive to said load sensing means for de-energizing said loading means when said loading operation is completed;

means for supplying an initial energizing signal to said cassette placing means to remove a used cassette from its operative relation with respect to said record/playback deck; and said conveyor motor energizing means is responsive to said deck sensing means to energize said conveyor motor when said used cassette no longer is in its operative relation with respect to said record/playback deck, and said cassette placing means is responsive to said conveyor sensing means to place said fresh cassette in operative relation with respect to said record/playback deck.

* * * * *